(12) United States Patent
Tecu et al.

(10) Patent No.: US 7,149,010 B2
(45) Date of Patent: Dec. 12, 2006

(54) TEMPLATE, SYSTEM AND METHOD FOR AUTOMATED SELECTION OF MEDIA TYPE AND SCANNING ROUTINE

(75) Inventors: Kirk Steven Tecu, Greeley, CO (US); William Robert Haas, Fort Collins, CO (US); David William Boll, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 865 days.

(21) Appl. No.: 09/903,465

(22) Filed: Jul. 11, 2001

(65) Prior Publication Data

US 2003/0016405 A1 Jan. 23, 2003

(51) Int. Cl.
*H04N 1/04* (2006.01)
*G06K 9/00* (2006.01)

(52) U.S. Cl. .................. 358/487; 358/488; 358/498; 382/318

(58) Field of Classification Search ............. 358/474, 358/475, 497, 496, 487, 488, 498, 505, 506; 382/209, 175, 318; 364/130
See application file for complete search history.

(56) References Cited

U.S. PATENT DOCUMENTS

| | | | | |
|---|---|---|---|---|
| 4,185,900 A | * | 1/1980 | Rabindran et al. | 353/26 R |
| 5,574,542 A | * | 11/1996 | Brook, III | 399/380 |
| 5,673,105 A | * | 9/1997 | Brook, III | 355/75 |
| 5,694,315 A | * | 12/1997 | Huang et al. | 700/1 |
| 5,786,590 A | | 7/1998 | Lin | |
| 5,943,137 A | | 8/1999 | Larson et al. | |
| 6,094,512 A | | 7/2000 | Lin et al. | |
| 6,195,182 B1 | * | 2/2001 | Kunishige | 358/487 |
| 6,714,324 B1 | * | 3/2004 | Kurosawa et al. | 358/487 |
| 6,850,344 B1 | * | 2/2005 | Chang | 358/487 |
| 2002/0039205 A1 | * | 4/2002 | Chang | 358/487 |

FOREIGN PATENT DOCUMENTS

| | | |
|---|---|---|
| GB | 2 270 575 | 3/1994 |
| GB | 2270575 A | 3/1994 |
| GB | 2 350 006 | 11/2000 |
| GB | 2350006 A | 11/2000 |

OTHER PUBLICATIONS

Foreign Communication including Search Report dated Jul. 18, 2005.

* cited by examiner

*Primary Examiner*—Jerome Grant
*Assistant Examiner*—Houshang Safaipour (57) ABSTRACT

A template for a scanner system comprising a template body and an element for generating an optical pattern when scanned by the scanner system is provided. A method of scanning an image on a transparent media comprising executing a reflective scan by the scanner system over a predefined carriage translation distance, comparing data imaged during the reflective scan with a reference pattern and determining subsequent scan procedures based upon the results of the comparison is provided. A scanner system comprising a reflective scanner, a transparent media adapter operable to backlight a transparent media and a template comprising an element for generating an optical pattern when scanned by the reflective scanner is provided.

19 Claims, 5 Drawing Sheets

TEMPLATE, SYSTEM AND METHOD FOR AUTOMATED SELECTION OF MEDIA TYPE AND SCANNING ROUTINE

TECHNICAL FIELD OF THE INVENTION

This invention relates to optical scanners and, more particularly, to a system and method of performing automated media recognition in a scanning system.

BACKGROUND OF THE INVENTION

Document scanners convert a visible image on media, such as and not by way of limitation, a document, photograph or a transparent media, into an electronic form suitable for copying, storing and processing by a computer. A document scanner may be a stand-alone device or integrated with a copier, a facsimile machine, a digital sender, or a multi-function device. Documents, or media, to be scanned may generally be classified as either transparent or opaque.

For opaque media, light is reflected off an image on the surface of the document onto a photosensitive device/s by a process referred to as a reflective scan. The photosensitive devices convert received light intensity into one or more electric signals. Transparent media are scanned by passing light through, rather than reflecting light off of, the document such as a 35 mm negative, whereupon the light is gathered by an optics system and directed onto an array of photosensitive devices. Transparent media may include either positive or negative images thereon. Document scanning systems operable to scan both transparent and opaque documents are available. Some conventional scanners include a separate light source to backlight the image on the transparent media. The backlight source may be included in a separate transparent media adapter. Alternatively, the backlight source may be integrated within the scanner equipment such as in the cover that overlays the scanner platen. Still other techniques for scanning both reflective and opaque documents include a completely passive adapter used in conjunction with a reflective scanner. Passive adapters do not require an additional light source for backlighting the transparent media. For example, one passive adapter for backlighting a transparent media collects light from the internal lamp of the reflective scanner that passes outside the area of the transparent media and reflects the light through the transparent media where it is gathered by the optic system. Other techniques for combining reflective and transparent media scanning into a single scanner device may be possible.

SUMMARY OF THE INVENTION

In accordance with an embodiment of the present invention, a template for a scanner system comprising a template body and an element for generating an optical pattern when scanned by the scanner system is provided.

In accordance with another embodiment of the invention, a method of scanning an image on a transparent media comprising executing a reflective scan by the scanner system over a predefined carriage translation distance, comparing data imaged during the reflective scan with a reference pattern and determining subsequent scan procedures based upon the results of the comparison is provided.

In accordance with another embodiment of the invention, a scanner system comprising a reflective scanner, a transparent media adapter operable to backlight a transparent media and a template comprising an element for generating an optical pattern when scanned by the reflective scanner is provided.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 7 of the drawings, like numerals being used for like and corresponding parts of the various drawings.

Figure 1:
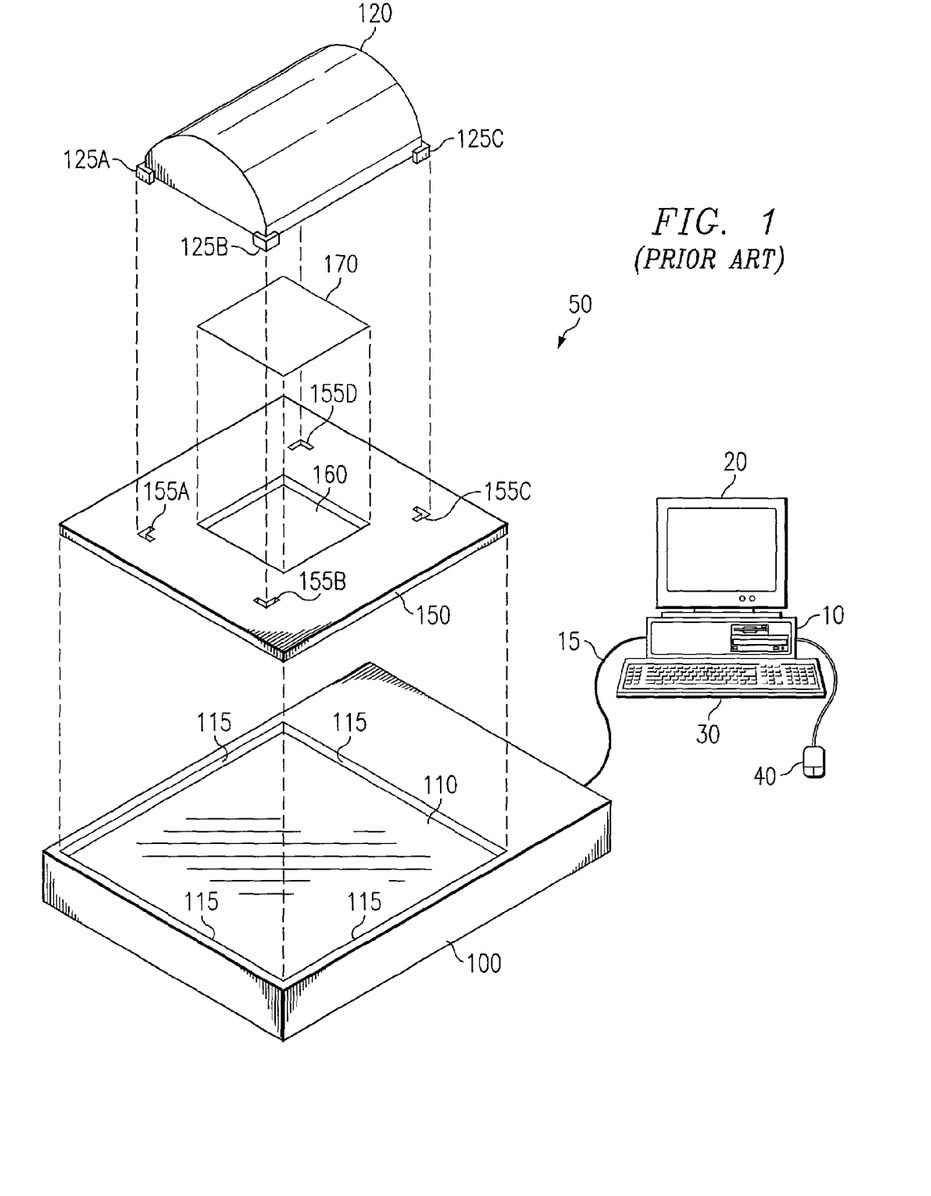
FIG. 1 is a perspective view of a document scanner system connected to a computer and operable to scan images on both opaque and transparent media as is known in the art.

Referring to FIG. 1, there is illustrated a scanner system 50 connected to a computer 10 and operable to scan images on both opaque and transparent media as is known in the prior art. Scanner system 50 comprises reflective scanner 100 which comprises a transparent platen 110 on which the document to be scanned is placed. Scanner 100 generally comprises a cover (not shown) or similar device that is placed over an opaque document prior to performing a reflective scan. A transparent media adapter 120 may be used in conjunction with reflective scanner 100 for enabling reflective scanner 100 to scan images on a transparent media 170 such as photographic negatives and slides. A template 150 may be used to properly position transparent media 170 on platen 110. Template 150 may be dimensioned such that it fits securely within recessed edges 115 of reflective scanner 100 around platen 110. Template 150 may include one or more insert areas 160 for accommodating one or more transparent media 170 therein. Template 150 may include one or more alignment elements 155A–155D, such as recessions, ridges or apertures, that may be engaged with one or more positioning elements 125A–125C on adapter 120 to facilitate proper alignment and positioning of adapter 120 on template 150.

In order to scan transparent media 170, template 150 is securely placed on platen 110 and transparent media 170 is placed in insert area 160 of template 150. Transparent media adapter 120 is then positioned over template 150 and produces a backlight shinning on transparent media 170 when the scanning operation is performed.

Computer 10 may be coupled to, and facilitate control of, scanner system 50 by a cable 15 via an external peripheral interface such as a parallel interface, a universal serial bus interface or other communications medium. Computer 10 may include one or more input devices, such as a keyboard 30 and a mouse 40, that allow user interaction therewith and facilitate user control of scanner system 50. One or more output devices, such as a monitor 20, a printer (not shown), memory (not shown), data storage devices (not shown) and other devices, may allow transfer of data from computer 10 to an external system.

Modern scanning systems allow various controls and system parameters to be controlled or manipulated by a user through user interactions with software modules executed on computer 10. For example, a user interacting with computer 10 may vary exposure rates performed by reflective scanner 100 when performing a particular type of scan. The user selection of transparent scan routines may deactivate an internal lamp of reflective scanner 100 and activate a lamp of adapter 120. Furthermore, user interactions can direct processing of imaged data. For example, a user may choose, through an interaction with computer 10, to perform image inversion on a scanned image. Invocation of various scan controls and image processing directives are possible through computer control of scanner system 50. Various scanner procedures or image processing procedures are collectively referred to herein as a scan routine. Numerous options may be provided to a user in the form of user specified scan routines. However, the potential for a user to inaccurately specify a scan routine is problematic. For example, a user desiring to scan a 35 mm photographic negative may inadvertently forget to specify an inversion of the image. The user may not recognize such an oversight until visual output is provided to the user. Heretofore, all known scanning systems operable to scan images on both transparent and opaque medias require user interaction to switch the scanner system between reflective and transparent media scan routines. However, the present invention reduces, or eliminates, the potential for erroneous scan routine execution by providing a system and method of automated media recognition in a scanner system.

Figure 2A:
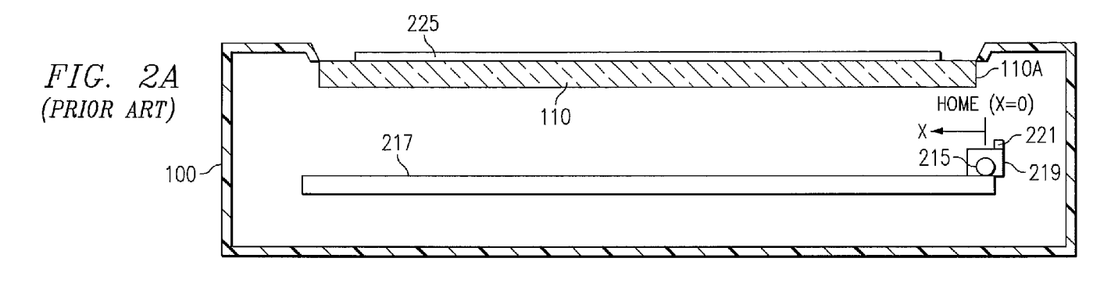
FIGS. 2A and 2B are respectively cross-sectional side views of the scanner system of FIG. 1 in configurations for scanning an image on an opaque media and a transparent media as is known in the art.

In FIG. 2A, a cross-sectional side view of reflective scanner 100 of FIG. 1 is shown in a configuration for scanning an image on an opaque media 225 as is known in the art. Scanner 100 comprises an internal lamp 215 that is attached to a carriage 219 operable to impart a linear motion of the lamp along a rail 217 or other structure. An optic system (not shown) may also be included on carriage 219 as well as a photosensitive device 221 such as an array of CCDs. Opaque media 225 is placed on platen 110 of scanner 100. As carriage 219 moves lamp 215 along the length, or a portion thereof, of rail 217, light from lamp 215 is directed onto the image on opaque media 225 through platen 110 and reflected. The reflected light is collected by an internal optic system (not shown) and directed onto photosensitive device 221 where the light is converted into one or more electric signals. Generally, carriage 219 has a home position (X=0) from which scan operations are initiated. The carriage home position will generally correspond to a leading edge 110A of platen 110. As light is radiated from lamp 215, carriage 219 moves through a translation distance (X) along rail 217. Photosensitive device 221 converts light radiated from lamp 215 as carriage 219 moves through the distance X.

Figure 2B:
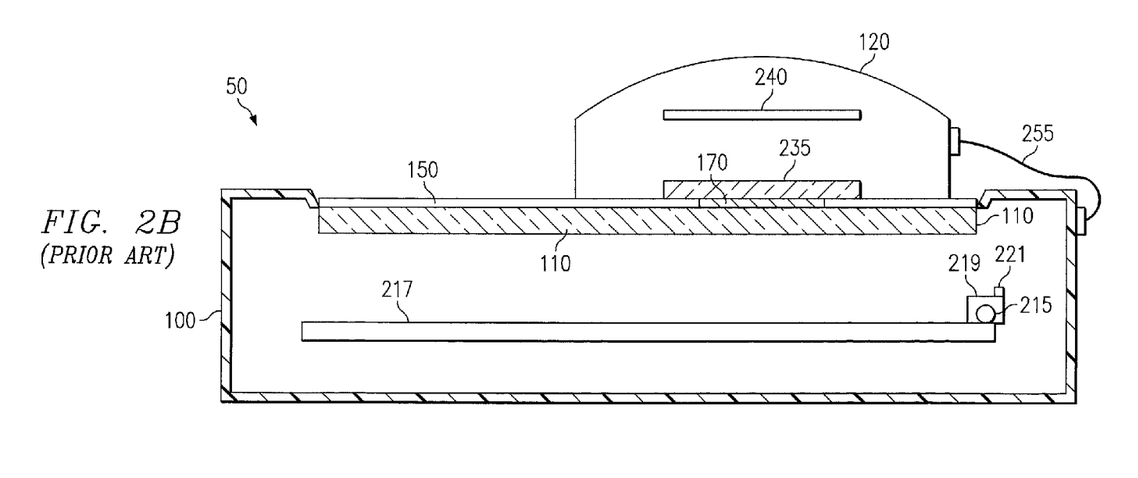

In FIG. 2B, a cross-sectional side view of reflective scanner 100 of FIG. 1 is shown in a configuration for scanning an image on a transparent media 170 as is known in the prior art. Template 150 is properly positioned on platen 110 of scanner 100. Transparent media 170 is secured within insert area 160 of template 150 and transparent media adapter 120 is placed on template 150. Transparent media adapter 120 preferably comprises an active backlight source such as one or more lamps 240. Alternatively, a passive transparent media adapter without a backlight source may be used. Adapter 120 may include a translucent panel 235 for allowing light radiating from lamp 240 to pass therethrough. Preferably, transparent media adapter 120 is detachably coupled to scanner 100 via one or more cables 255. Cable 255 may provide power for the lamp 240 and/or other electronic components of the adapter as well as a communication channel between adapter 120 and scanner 100.

Scanning an image on an opaque media with a reflective scanner 100 generally requires lamp 215 within scanner 100 to be activated while lamp 240 of adapter 120 is deactivated. The optic system is generally positioned within reflective scanner 100 such that light from internal lamp 215 impinges on the opaque document and is reflected back into scanner 100. The optic system gathers this reflected light and directs it to photosensitive device 221. It is preferable that lamp 215 is deactivated and adapter lamp 240 is activated when scanning images on a transparent media. Light radiating from adapter lamp 240 will pass through translucent panel 235, through transparent media 170 and through platen 110 whereupon it is passed through an optic system and onto photosensitive device 221.

A dual-media scanning system operable to scan images on both opaque and transparent medias preferably comprises an active adapter 120. Adapter 120 typically comprises a switching mechanism (not shown) for activating or deactivating adapter lamp 240 as well as scanner lamp 215. The switching mechanism has heretofore been performed through software by user interaction with computer 10 or another device attached to the scanner. Other scanning systems may include power switches on the adapter and/or the scanner itself for activating and deactivating the lamps of the respective scanner and adapter. Regardless of the specific mechanism used for activating and deactivating the lamps of the scanner and adapter, existing scanning systems require some form of manual user interaction to activate and deactivate the scanner and adapter lamps when changing between opaque and transparent media. Furthermore, different types of transparent media may require the user to initiate the execution of different software routines for appropriate processing of the scanned image. For example, negative and positive images on respective transparent media may require identical backlighting conditions but scans of negative images require that the scanned image be inverted to a corresponding positive image. Moreover, scans of positive and negative images may require different exposure rates. Thus, user interaction for operating a dual-media scanning system may require selection of opaque or transparent media as well as selection of an exposure rate. A selection of transparent media may require additional user interactions for directing processing of the scanned image. However, the present invention provides a template and an adapter that, when used in conjunction with a reflective scanner, provide automated media recognition and scan routine selection in response thereto.

Figure 3:
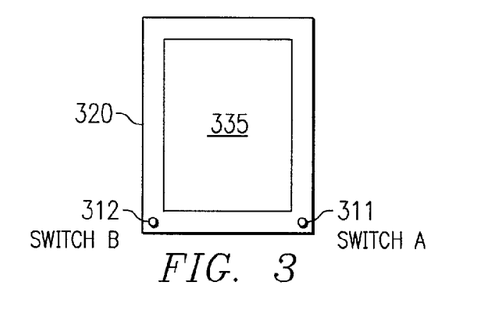
FIG. 3 is a bottom view of an exemplary transparent media adapter operable to facilitate automatic media recognition according to the teachings of the invention.

In FIG. 3, a bottom view of an exemplary transparent media adapter 320 operable to facilitate automatic media recognition in a scanning system according to the teachings of the invention is shown. Adapter 320 and a template 350 (described hereinbelow with reference to FIGS. 4A and 4B)

may be respectively substituted for adapter 120 and template 150 in scanner system 50 described with reference to FIG. 1. Adapter 320 is generally coupled to a scanner system similar to flatbed reflective scanner 100 depicted in FIG. 1. Adapter 320 of the present invention may include a translucent panel 335 through which light from a lamp (not shown) in adapter 320 can be directed toward a transparent media. Adapter 320 differs from prior art adapters 120 by comprising one or more switches 311 and 312 located on a bottom surface thereof to interact with one or more actuation mechanisms or devices located on a template of the present invention. According to the present invention, different templates with different arrangements of actuation mechanisms are provided for scanning different types of documents so that switches 311 and 312 are actuated by the actuation mechanisms to automatically put the document scan system and the computer in the proper operation mode.

One or more switches 311 (switch A) and 312 (switch B) may be actuated by interaction with elements on appropriate templates described in detail below and a signal associated therewith is then transmitted to scanner 100 and computer 10. Computer 10 is operable to execute a scan routine in response to an interpretation of the switch signal. One or more scan routines may be stored on a memory or storage device of computer 10. Each scan routine may have a distinct switch signal associated therewith and, upon interpretation of the signal by the computer, the associated scan routine may be fetched from the storage device and executed by computer 10. In the present example, three exemplary scan routines may be executed in response to the switch states of switches 311 (switch A) and 312 (switch B):

TABLE A

| Scan Routine | Switch State | |
|---|---|---|
| | A | B |
| Opaque | OFF | OFF |
| Slide (Color) | ON | OFF |
| Negative | ON | ON |

One or more scanner and adapter attributes may also be associated with each switch state or scan routine. As shown in TABLE B, an active lamp attribute may specify whether the adapter lamp or the scanner lamp is activated. An inversion attribute may be associated with each switch state or each scan routine and specify whether the scanned image is to be inverted. Other attributes associated with the scan routines are possible, such as an exposure rate attribute. A scanner system of the invention may feature one or more of the scan routines each having one or more attributes. For example, an implementation of the invention may consist of a single scan routine that features only the active lamp attribute.

TABLE B

| Scan Routine | Scan Routine Attribute | |
|---|---|---|
| | Active Lamp | Inversion |
| Opaque | Scanner | Inactive |
| Slide (Color) | Adapter | Inactive |
| Negative | Adapter | Active |

Figure 4A:
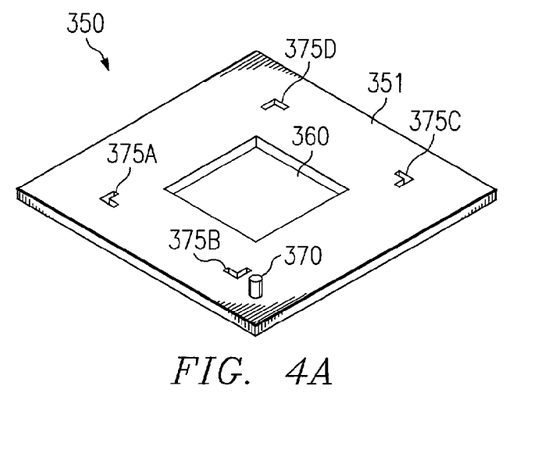
FIGS. 4A and 4B are perspective views of two templates for a scanner system of the invention that facilitate automated media recognition according to the teachings of the invention.

With reference now to FIG. 4A, an exemplary template 350 for providing automated media recognition according to the teachings of the invention is shown. Template 350 comprises an insert area 360 that may accommodate the insertion of a transparent media, for example a slide, therein. The insert area 360 may comprise a slot, or otherwise cut-out portion of template body 351, that is open in the absence of a transparent media secured therein. Template body 351 may be opaque for facilitating a high quality scan of images on a transparent media secured in insert area 360. Template 350 comprises an actuation mechanism such that a scan software routine associated with a particular media may be executed, or loaded in a computer 10 for subsequent execution, upon an automated recognition of the media type. Multiple templates may be provided and include distinct arrangements of one or more actuation mechanisms that enable execution of multiple scan routines. Each template having a distinct arrangement of actuation mechanisms may be associated with a particular media type and may include an insert area dimensioned for accommodating that particular media, for example slides and 35 mm negatives. Template 350 comprises an actuation mechanism, for example a projection 370, on a surface 351 thereof. In the present example, insert area 360 is dimensioned to accommodate a transparent slide. Template 350 may include alignment elements 375A–375D that facilitate appropriate placement of adapter 320 thereon and ensure proper alignment of switches 311 and 312 with actuation mechanism(s) on surface 351 of template 350. Proper placement of adapter 320 on template 350 causes projection 370 to actuate switch 311 and maintains switch 312 in a non-actuated state. Accordingly, a signal indicating an ON state of switch 311 may be generated in adapter 320 and transmitted to computer 10, or another device, coupled to the scanner system. This signal may be transmitted via a cable connecting adapter 320 and scanner 100 and forwarded from scanner 100 to computer 10 via an external peripheral interface. The signal is then interpreted at computer 10 or another logic device. The scan routine associated with the switch state of the switches (A—ON, B—OFF in the present example) is then retrieved and executed according to TABLE A, for example. Computer 10 may also activate the adapter lamp and deactivate the scanner lamp according to TABLE B, for example. Other scan routine procedures having attributes associated therewith may be fetched and executed by computer 10 in response to interpretation of the signal, for example an exposure rate of scanner 100 may be set, inversion processing may be enabled or disabled as well as enablement or disablement of other scan routine procedures.

Figure 4B:
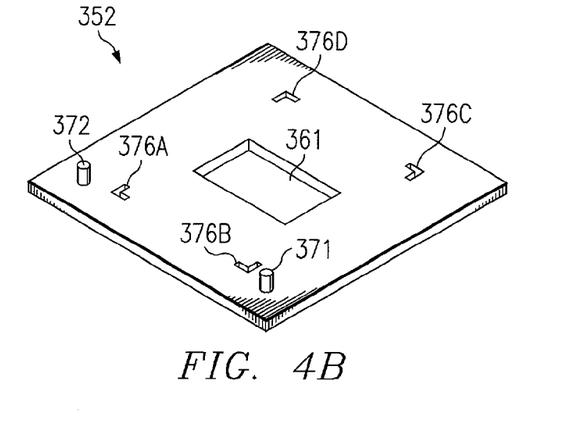

In FIG. 4B, a second exemplary template 352 of the invention is shown. Template 352 comprises an insert area 361 and may include adapter alignment elements 376A–376D. Template 352 comprises actuation mechanisms, for example projections 371 and 372, for actuating switches 311 and 312 of adapter 320. Accordingly, proper placement of adapter 320 on template 352 results in the actuation of switches 311 and 312 and generation of a signal indicative of the switch states (switch A—ON; switch B—ON). Accordingly, the Negative scan routine may be executed upon reception and interpretation of the signal by computer 10 according to TABLE A. Furthermore, the adapter lamp is activated and the scanner lamp is deactivated to enable backlighting of a negative for scanning according to the scan attributes of TABLE B.

Figure 5:
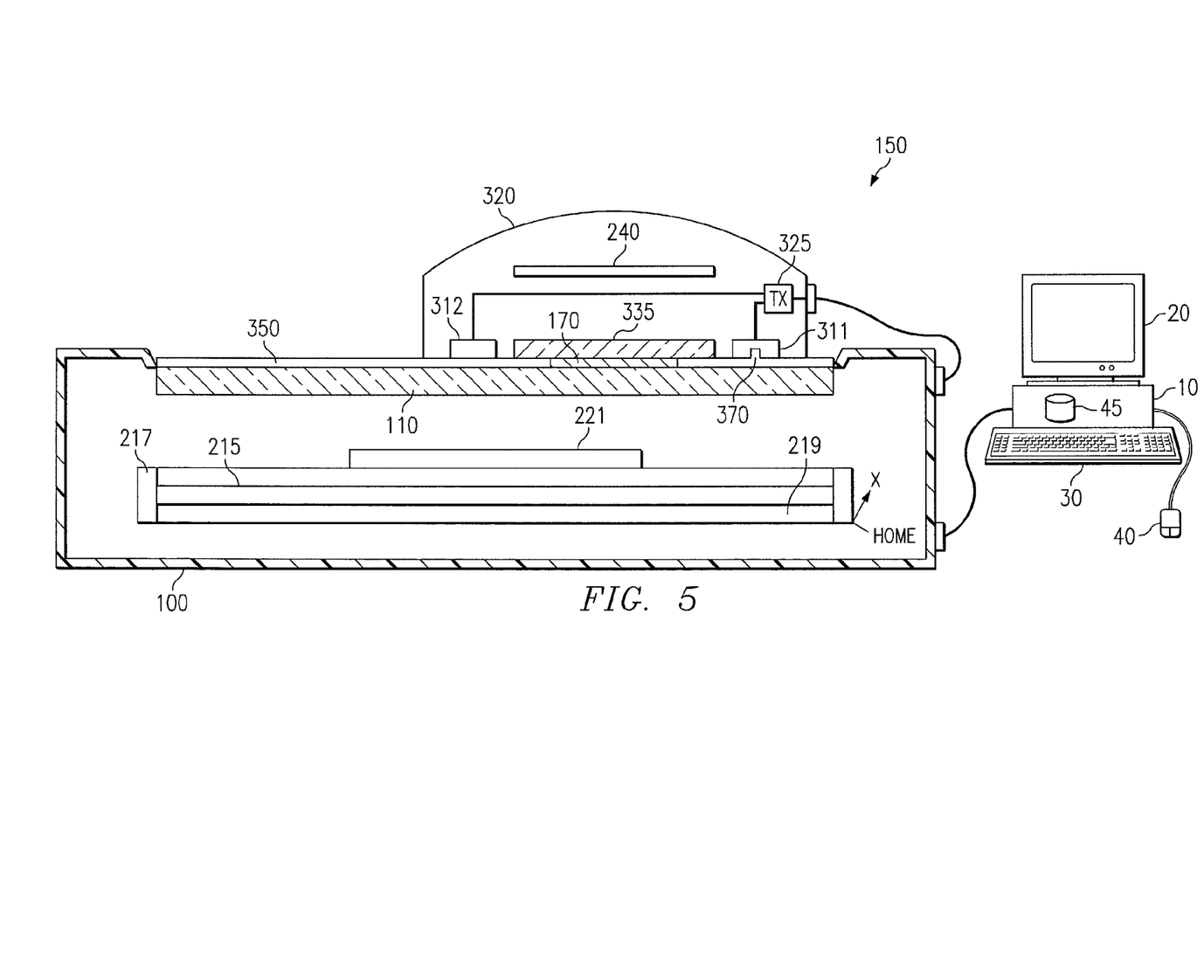
FIG. 5 is a cross-sectional front view of a scanner system comprising a transparent media adapter and a template according to the teachings of the invention.

In FIG. 5, a front sectional view of a scanning system 150 comprising transparent media adapter 320 and reflective scanner 100 coupled to computer 10 according to the teachings of the invention is shown. Transparent media adapter 320 comprises one or more switches 311 and 312 each coupled to a signal transmission mechanism 325 operable to transmit a signal indicative of the switch states of switches 311 and 312. Template 350 is placed on platen 110 of scanner 100. Transparent media 170 is inserted into insert area 360 of template 350. Transparent media adapter 320 is placed on template 350 and, accordingly, protrusion 370 of template 350 actuates switch 311 of transparent media adapter 320. A user may choose to perform a scan routine by providing an input to computer 10. Signal transmission mechanism 325 transmits a signal indicative of the switch states (in the example, switch 311 is OFF and switch 312 is ON) to computer 10. Computer 10 may include a record set or database 45 that stores one or more scan routines each indexed with a signal transmittable by transparent media adapter 320. Upon reception of the signal, computer 10 may interrogate database 45 using the received signal as an index thereto. A scan routine indexed by the signal may then be executed by scanning system 150 upon direction of computer 10. Alternatively, computer 10 may initiate or flag the scan routine indexed by the received signal and wait for a user input before directing scanning system 150 to execute the routine.

Figure 6A:
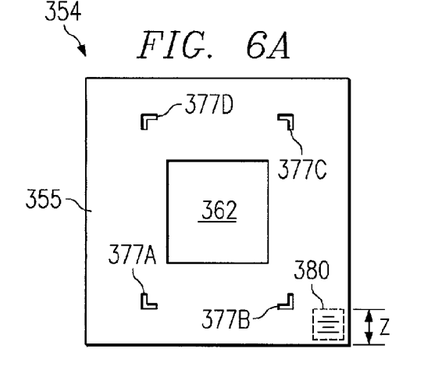
FIGS. 6A and 6B are top views of alternative templates that may facilitate automated media recognition according to the teachings of the invention.

In FIG. 6A, a top view of a template 354 that provides an alternative mechanism for providing automated media recognition in a scanner system according to the teachings of the invention is shown. Template 354 comprises an insert area 362 and may include alignment elements 377A–377D that facilitate proper positioning of transparent media adapter 320 thereon. Template 354 comprises an actuation mechanism that facilitates automated media recognition. An actuation mechanism may comprise an optical pattern 380 such as a bar code or other pattern printed on template body. Conventional adapter 120, that is an adapter not featuring switches as described with reference to adapter 320, may be used in conjunction with template 354. Accordingly, scanner system 150 of the invention may include a conventional adapter 120 and a template 354 respectively substituted for adapter 320 and template 350 in the configuration illustrated in FIG. 5.

In operation, a scan may be initiated, for example through user interaction with computer 10, after template 354 has a transparent media secured in the insert area 362 and template 354 is properly placed on scanner platen 110. Computer 10 first assumes a reflective scan is to be performed and an opaque scan routine is executed. The lamp of scanner 100 is carried through a predefined translation distance (X) through which a reflective scan is performed. An analysis of the imaged data generated through the translation distance X is then made by computer 10. One or more digital reference optical patterns are maintained in a memory or storage medium in computer 10, for example in database 45. After imaging template optical pattern 380 scanned within the predefined translation distance (X), a comparison of the imaged portion is made with the one or more stored digital reference optical patterns. A result indicating a match between one of the reference patterns and the template pattern 380 would indicate a particular type of scan routine is to be performed. Each of the one or more reference patterns stored in computer 10 may have a scan routine associated, or cross-referenced, therewith. Upon detecting a match in template pattern 380 and a reference pattern, the reflective scan routine is aborted and the scan routine associated with the reference pattern may be fetched and executed by computer 10.

Figure 6B:
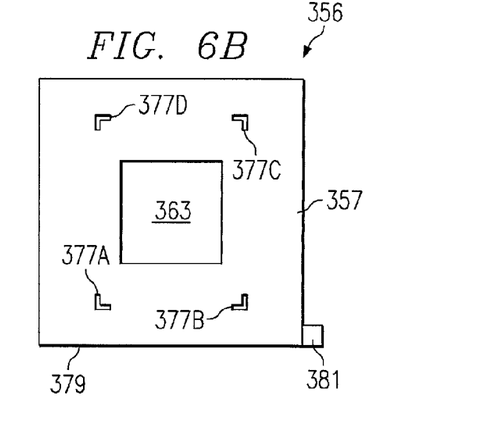

In FIG. 6B, a template 356 having a protruding tab 381 that facilitates automated media recognition according to the teachings of the invention is shown. The media recognition mechanism is similar to that described with reference to FIG. 6A but does not require an initial carriage motion to implement. Rather, a protruding tab 381 or another similar structure is comprised as an actuation mechanism and is visible by the optic system while the scanner lamp is activated and the carriage is in the home position. Thus, when the scanner lamp is activated during a default reflective scan routine, the optic system can acquire imaging data at the home position and determine the presence or absence of tab 381. An analysis of this information is made and, if the protruding tab is detected, the reflective scan may be aborted and a transparent media scan routine may be executed. Different scan routines can be executed by templates similar to template 356 by providing different configuration of protruding tabs, for example multiple tabs or a single tab disposed at a different position on template body 357. Accordingly, multiple scan routines may be stored in computer 10 and associated with a particular configuration of tab 381 (or multiple tabs). In the absence of tab 381, a default scan routine, such as a reflective scan routine, may be executed. Accordingly, scanner system 150 of the invention may include a conventional adapter 120 and a template 354 respectively substituted for adapter 320 and template 350 in the configuration illustrated in FIG. 5.

Figure 7:
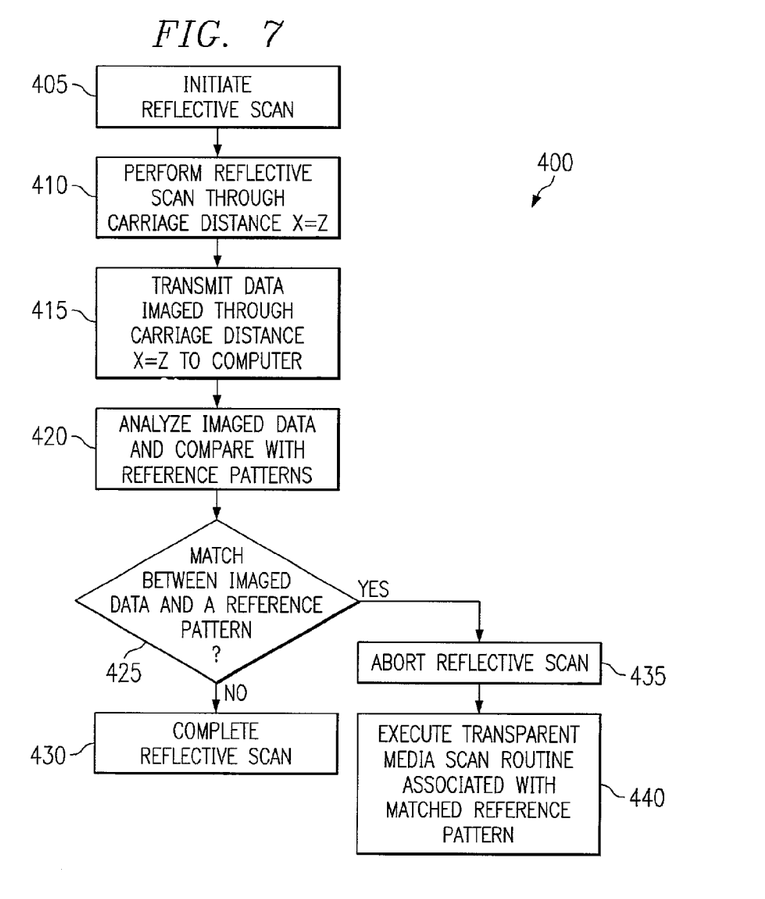
FIG. 7 is a flowchart depicting a process flow of a scanner system utilizing a template described in FIGS. 6A and 6B according to the teachings of the invention.

In FIG. 7, a flowchart 400 for performing automated media recognition and scan routine execution in a scanner system implementing optical pattern recognition on a template of scanner system 150 (having template 354 substituted for template 350) according to the teachings of the invention is shown. A reflective scan is initiated (step 405) by a user providing a command, for example by interacting with a user interface displayed on monitor 20. Scanner system 150 executes a reflective scan routine upon command of computer 10 (step 410). The reflective scan routine may include scanning a portion, or predefined distance (X), of template 354 in which one or more template patterns 380 may be included. The imaged data obtained by scanning this portion of template 354 is then transmitted to computer 10 (step 415). Computer 10 may include a record or database 45 of reference patterns. Each reference pattern has a scan routine associated therewith and is used as an index for execution of the associated scan routine. Computer 10 then interrogates database 45 and compares the image of template pattern 380 obtained from the partial scan of template 354 to the reference patterns in database 45 (step 420). An evaluation is made to determine if there is a matching reference pattern for imaged template pattern 380 (step 425). If a match is not found, computer 10 directs scanner system 150 to continue with the reflective scan (step 430). If, however, a match between the imaged data and a reference pattern is detected, computer 10 directs scanner system 150 to abort the reflective scan (step 435) and to execute the scan routine associated with the reference pattern that matches the imaged data (step 440).

The flowchart 400 of FIG. 7 may also represent the process flow of scanner system 150 having template 356 substituted for template 350. Specifically, the carriage travel, or distance X, may be set to zero (Z=0) prior to scanning and generating imaged data that is to be compared with reference patterns in database 45. This data may then be analyzed and compared to reference patterns that may indicate a match in the pattern, for example the number and/or location, of tabs located along an edge 379 of template 356 that is positioned against a front edge of platen 110 that lies within the field of view of lamp 215 while the carriage is located in the home position.

The template-scanner actuation mechanisms described are illustrative only. Other actuation mechanisms may be devised for facilitating automated media recognition according to the teachings herein. For example, a template body surrounding an insert area may be opaque. One or more apertures may be disposed on the template body, for example at a position corresponding to the location of template optical pattern 380 (FIG. 6A) such that light from a lamp of an adapter placed thereon may pass therethrough. The scanner may default to an opaque scan routine and, after a predefined translation distance X made by the carriage supporting scanner lamp 215, an analysis may be made to determine if light has been detected at a location scanned within the predefined translation distance. A confirmation that light has been detected may result in the opaque scan routine being aborted and execution of a scan routine associated with the detection of light being initiated. Multiple scan routines may be stored in computer 10 and executed by having multiple templates with different configurations of apertures and multiple reference light patterns stored in computer 10 for comparison to detected light patterns. Each of the reference light patterns may be associated with a particular scan routine and confirmation of a match between a detected light pattern and a reference light pattern results in execution of the scan routine associated with the reference light pattern.

As described, a scanner system operable to perform automated media recognition is provided. An actuation mechanism included on a template, such as one or more protrusions or an optical pattern that respectively interact with switches on a transparent media adapter and an optic system of a scanner, actuates a signal transmission that results in execution of a transparent media scan routine by the scanner system. A signal generated by actuation of the switch indicates that a particular media scan routine is to be executed by the scanner system. A transparent media adapter comprising a switch actuatable by a protrusion on a template is provided. Actuation of the switch results in generation of a signal by the adapter and the scanning system executes a scan routine in response to transmission of the signal. Accordingly, automated media recognition in a scanner system is provided.

What is claimed is:

1. A template for a scanner system, the template comprising:
    a template body adapted to receive a media object to be scanned, the template body usable with a scanning system capable of performing a reflective scan routine and a transparent scan routine; and
    an element disposed on the template for generating an optical pattern when scanned in the scanner system, the optical pattern indicating to the scanner system whether to perform at the reflective scan routine or the transparent scan routine for scanning the media object.

2. The template according to claim 1, wherein the template further comprises an insert area for receiving a transparent media therein.

3. The template according to claim 1, wherein the element is a pattern printed on the template body.

4. The template according to claim 1, wherein the element is a tab connected to an edge of the template body.

5. The template according to claim 1, wherein the element is an aperture on the template body.

6. The template according to claim 1, wherein the optical pattern is comparable to one or more reference patterns stored in a computer.

7. The template according to claim 6, wherein the computer directs the scanner system to execute a scan routine upon determining a match between the optical pattern and one of the reference patterns.

8. A scanner system for optically scanning a media, the scanner system comprising:
    a reflective scanner comprising a platen, a lamp, an optic system and one or more photosensitive devices;
    a transparent media adapter comprising a housing and operable to backlight a transparent media; and
    a template adapted to receive a media for scanning, the template comprising an element for generating an optical pattern when scanned in the scanner system, the optical pattern indicating a particular scan routine for scanning the media.

9. The scanner system according to claim 8, wherein the scanner system is coupled to a computer, the computer storing one or more reference patterns each associated with a scan routine, the scanner system performing a reflective scan over a predefined distance of carriage translation and transmitting imaged data obtained by the reflective scan to the computer, the computer operable with the reference patterns.

10. The scanner system according to claim 9, wherein the computer detects a match between the imaged data and one of the reference patterns, the computer directing the scanner system to abort the reflective scan and execute a transparent media scan.

11. The scanner system according to claim 9, wherein the computer fails to detect a match between the imaged data and one of the reference patterns, the computer directing the scanner system to resume the reflective scan.

12. The scanner system according to claim 8, wherein the element is a optical pattern printed on the template body.

13. The scanner system according to claim 1, wherein the element is an aperture.

14. The scanner system according to claim 1, wherein the element is a tab connected to an edge of the template body.

15. A template for a scanner system, the template comprising:
    a template body configured to receive a media object to be scanned, the template body usable with a scanner system capable of illuminating the media object with a reflective light source and a backlight source; and
    an element disposed on the template for generating an optical pattern when scanned in the scanner system, the optical pattern indicating to the scanner system whether to activate the reflective light source or the backlight source for scanning the media object.

16. The template of claim 15, wherein the element is a pattern printed on the template body.

17. The template of claim 15, wherein the element is a tab connected to an edge of the template body.

18. The template of claim 15, wherein the optical pattern is comparable to one or more reference patterns stored in a computer.

19. The template of claim 18, wherein the computer directs the scanner system to execute a particular scan routine upon determining a match between the optical pattern and one of the reference patterns.

* * * * *

UNITED STATES PATENT AND TRADEMARK OFFICE
CERTIFICATE OF CORRECTION

PATENT NO. : 7,149,010 B2  Page 1 of 1
APPLICATION NO. : 09/903465
DATED : December 12, 2006
INVENTOR(S) : Kirk Steven Tecu et al.

It is certified that error appears in the above-identified patent and that said Letters Patent is hereby corrected as shown below:

In column 9, line 51, in Claim 1, after "perform" delete "at".

In column 10, line 2, in Claim 7, after "execute" delete "a" and insert -- the particular --, therefor.

In column 10, line 23, in Claim 9, after "operable" insert -- to compare the imaged data --.

In column 10, line 36, in Claim 13, delete "claim 1" and insert -- claim 8 --, therefor.

In column 10, line 38, in Claim 14, delete "claim 1" and insert -- claim 8 --, therefor.

Signed and Sealed this

Twenty-eighth Day of April, 2009

JOHN DOLL
*Acting Director of the United States Patent and Trademark Office*